United States Patent
Nakai et al.

(10) Patent No.: US 8,912,982 B2
(45) Date of Patent: Dec. 16, 2014

(54) DISPLAY DEVICE

(75) Inventors: Yutaka Nakai, Kanagawa-ken (JP); Tsuyoshi Hioki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

(21) Appl. No.: 13/490,656

(22) Filed: Jun. 7, 2012

(65) Prior Publication Data

US 2013/0082904 A1 Apr. 4, 2013

(30) Foreign Application Priority Data

Sep. 29, 2011 (JP) .................................. 2011-214398

(51) Int. Cl.
*G09G 3/00* (2006.01)
*G02F 1/1335* (2006.01)
*G09F 9/35* (2006.01)
*G02F 1/1333* (2006.01)

(52) U.S. Cl.
CPC ...... *G09F 9/35* (2013.01); *G02F 2001/133388* (2013.01); *G02F 1/133526* (2013.01)
USPC .......................... 345/32; 345/7; 345/8; 345/9

(58) Field of Classification Search
CPC ... G09F 9/35; G02F 1/1335; G02F 1/133526; G02F 2001/133388
USPC ................... 345/32, 7, 8, 175, 9, 647; 353/10; 382/128; 359/626, 630, 708
See application file for complete search history.

(56) References Cited

U.S. PATENT DOCUMENTS

| 7,068,444 B2* | 6/2006 | Nishi .............................. 359/708 |
| 8,434,872 B2* | 5/2013 | Maekawa ......................... 353/10 |
| 8,437,087 B2* | 5/2013 | Tohara et al. ................. 359/630 |
| 8,553,069 B2* | 10/2013 | Kweon ............................ 348/36 |
| 2002/0097197 A1* | 7/2002 | Togino et al. ..................... 345/8 |
| 2006/0072215 A1* | 4/2006 | Nishi ............................. 359/708 |
| 2009/0116708 A1* | 5/2009 | Kim ............................... 382/128 |
| 2009/0122412 A1* | 5/2009 | Steenblik et al. ............. 359/626 |

(Continued)

FOREIGN PATENT DOCUMENTS

| JP | 2003-207742 | 7/2003 |
| JP | 2004-020693 | 1/2004 |
| JP | 2010-262229 | 11/2010 |
| JP | 2011-070073 | 4/2011 |

OTHER PUBLICATIONS

Office Action of Notification of Reason(s) for Refusal for Japanese Patent Application No. 2011-214398 Dated Feb. 17, 2014, 6 pgs.

*Primary Examiner* — Thuy Pardo
(74) *Attorney, Agent, or Firm* — Amin, Turocy & Watson, LLP

(57) ABSTRACT

According to one embodiment, a display device includes a display unit, an imaging element, and a first reflecting unit. The display unit emits a light. The imaging element has a major surface and is configured to form a real image of an object at a symmetric position of the object with the major surface serving as a plane of symmetry. The imaging element includes a portion not overlapping the display unit as viewed along a normal direction of the major surface. The first reflecting unit includes a portion facing the major surface, and is configured to reflect the light emitted from the display unit and to cause the light to be incident on the portion of the imaging element not overlapping the display unit.

20 Claims, 8 Drawing Sheets

(56) References Cited

U.S. PATENT DOCUMENTS

2010/0195055 A1* 8/2010 Maekawa .................. 353/10
2011/0074657 A1* 3/2011 Sugiyama .................. 345/7
2011/0304588 A1* 12/2011 Tsai et al. .................. 345/175
2012/0081788 A1 4/2012 Maekawa et al.

* cited by examiner

DISPLAY DEVICE

CROSS-REFERENCE TO RELATED APPLICATIONS

This application is based upon and claims the benefit of priority from the prior Japanese Patent Application No. 2011-214398, filed on Sep. 29, 2011; the entire contents of which are incorporated herein by reference.

FIELD

Embodiments described herein relate generally to a display device.

BACKGROUND

There is considered a device in which only the in-plane direction component of the direction vector of light incident on the device surface undergoes an action equivalent to retroreflection, with the other components conserved. Such a device forms a real image at the position plane-symmetric with respect to the device surface. By using this device, a real image can be formed at a position distant from the device surface. Thus, a visual image looking like floating in the air can be presented. A practical configuration capable of increasing the floating amount of the real image is desired.

DETAILED DESCRIPTION

Figure 1:
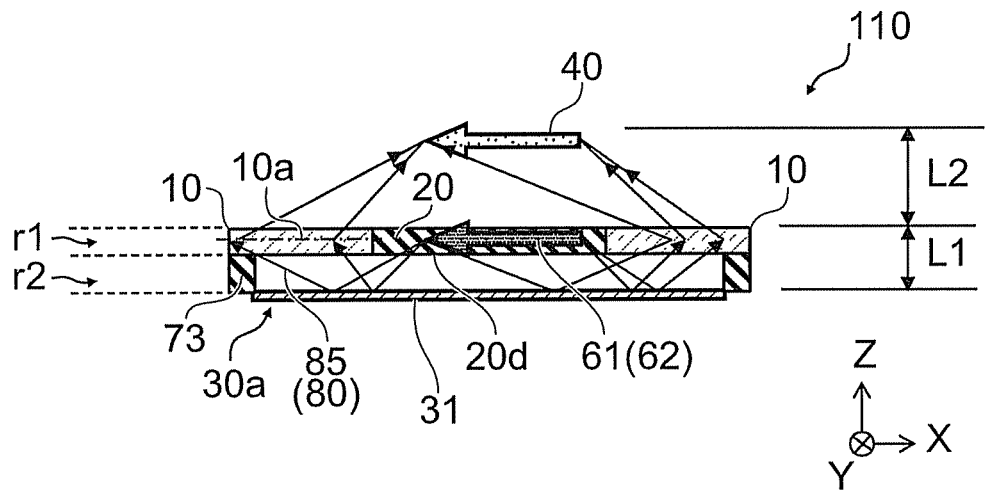
FIG. 1 is a schematic sectional view showing a display device according to a first embodiment.

According to one embodiment, a display device includes a display unit, an imaging element, and a first reflecting unit. The display unit emits a light. The imaging element has a major surface and is configured to form a real image of an object at a symmetric position of the object with the major surface serving as a plane of symmetry. The imaging element includes a portion not overlapping the display unit as viewed along a normal direction of the major surface. The first reflecting unit includes a portion facing the major surface, and is configured to reflect the light emitted from the display unit and to cause the light to be incident on the portion of the imaging element not overlapping the display unit.

Various embodiments will be described hereinafter with reference to the accompanying drawings.

The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

In the present specification and the drawings, components similar to those described previously with reference to earlier figures are labeled with like reference numerals, and the detailed description thereof is omitted appropriately.

First Embodiment

Figure 2:
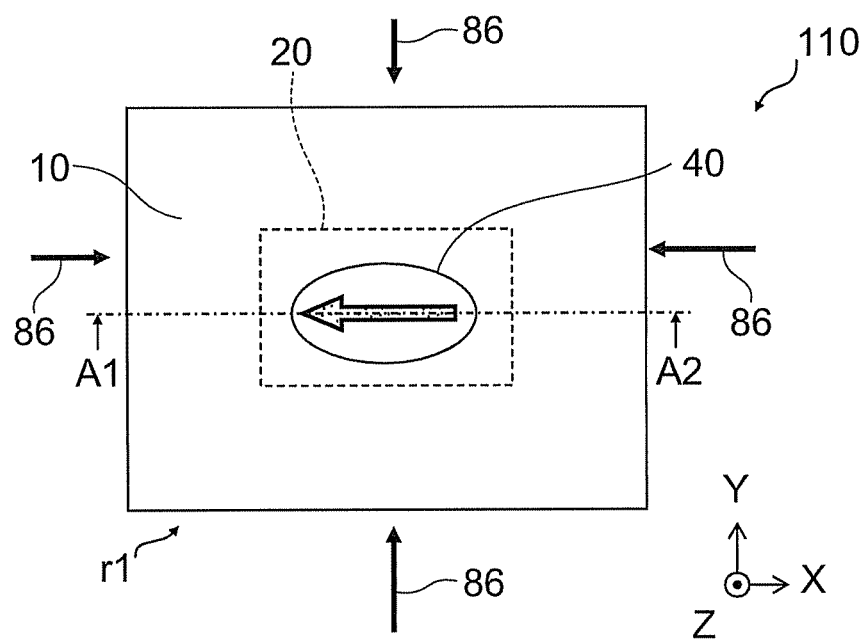
FIG. 2 is a schematic plan view showing the display device according to the first embodiment.

FIG. 1 is a sectional view taken along line A1-A2 of FIG. 2.

As shown in FIG. 1, the display device 110 according to the embodiment includes an imaging element 10, a display unit 20, and a first reflecting unit 31.

The display unit 20 is provided together with the imaging element 10. The display unit 20 emits light 80. The light 80 includes a picture 61. Here, there may be a case where a light source is provided independently of the display unit 20. In this case, the light radiated from the light source is reflected by the display unit 20, and travels from the display unit 20 toward the outside of the display unit 20. This case is also included in the case where the display unit 20 emits light.

The first reflecting unit 31 includes at least a portion 30a facing the imaging element 10. The first reflecting unit 31 reflects the light 80 emitted from the display unit 20 and causes it to be incident on the imaging element 10.

The imaging element 10 includes a major surface 10a. The imaging element 10 includes a portion not overlapping the display unit 20 as viewed along the normal direction of the major surface 10a. In this example, the imaging element 10 does not overlap the display unit 20 as viewed along the normal direction of the major surface 10a. For instance, the display unit 20 and the imaging element 10 are disposed in a direction non-parallel to the normal to the major surface 10a. In this example, the display unit 20 and the imaging element 10 are disposed in a direction parallel to the major surface 10a. However, as described later, the disposal of the display unit 20 can be variously modified. In this description, the positional relationship among a plurality of elements is defined by e.g. the positional relationship among the barycenters of the plurality of elements. The first reflecting unit 31 reflects the light 80 emitted from the display unit 20 and causes it to be incident on the portion of the imaging element 10 not overlapping the display unit 20 as viewed along the normal direction of the major surface 10a.

For instance, in space, a first region r1 and a second region r2 are provided. The first region r1 and the second region r2 are shaped like layers. The first region r1 is shaped like a layer parallel to one plane in space. The second region r2 is provided parallel to the first region r1. That is, the second region r2 is also shaped like a layer parallel to that plane.

In this example, the imaging element 10 is provided in the first region r1. The imaging element 10 includes a major surface 10a. For instance, the major surface 10a is substantially parallel to the surface of the layer of the first region r1. However, the embodiment is not limited thereto. The major surface 10a may be inclined with respect to the plane of the layer of the first region r1.

In this example, the display unit 20 is provided in the first region r1. That is, the display unit 20 and the imaging element 10 are disposed in the first region r1. For instance, the display unit 20 includes a display surface 20d for emitting light 80. The display surface 20d is e.g. planar. The display surface 20d is e.g. substantially parallel to the surface of the layer of the first region r1. However, the embodiment is not limited thereto. The display surface 20d may be inclined with respect to the plane of the layer of the first region r1. In this example, the display unit 20 is provided in the same plane as the imaging element 10. However, the embodiment is not limited thereto. The display unit 20 may be provided in a plane different from the plane in which the imaging element 10 is provided.

The first reflecting unit 31 is provided in the second region r2. For instance, the reflecting surface of the first reflecting unit 31 is disposed substantially parallel to the major surface 10a of the imaging element 10.

For instance, the distance between the first reflecting unit 31 and the imaging element 10 is controlled by a distance control unit 73 (such as a spacer). The distance between the first reflecting unit 31 and the imaging element 10 may be either fixed or variable. That is, the display device 110 can further include a distance control unit 73 for changing at least one of the distance between the first reflecting unit 31 and the display unit 20, and the distance between the first reflecting unit 31 and the imaging element 10.

On the display surface 20d of the display unit 20, for instance, a picture 61 is formed. The picture 61 on the display unit 20 may be an object 62.

The picture 61 is reflected at the first reflecting unit 31. The light 80 including the picture 61 travels along an optical path 85 and is incident on the imaging element 10. The imaging element 10 forms a real image 40 based on the light 80. The real image 40 is disposed at a position on the opposite side of the imaging element 10 from the first reflecting unit 31. As viewed from the viewer, the real image 40 is perceived as floating above the imaging element 10 (above the display unit 20).

Thus, the imaging element 10 (and the display unit 20) is disposed between the real image 40 and the first reflecting unit 31. That is, the first region r1 is disposed between the real image 40 and the second region r2.

Here, for convenience of description, the plane parallel to the layer surface of the first region r1 and the second region r2 is defined as X-Y plane. For instance, the major surface 10a of the imaging element 10 is parallel to the X-Y plane. One axis parallel to the X-Y plane is defined as X-axis. The axis parallel to the X-Y plane and perpendicular to the X-axis is defined as Y-axis. The axis perpendicular to the X-Y plane is defined as Z-axis.

Here, the distance along the Z-axis between the first reflecting unit 31 and the imaging element 10 is defined as first distance L1. The distance along the Z-axis between the imaging element 10 and the real image 40 is defined as second distance L2. The thickness of the display device 110 depends on the first distance L1. The second distance L2 corresponds to the floating height of the real image 40.

As shown in FIG. 2, the imaging element 10 and the display unit 20 are disposed so that the imaging element 10 surrounds the display unit 20 in the first region r1. For instance, the imaging element 10 surrounds the display unit 20 in a plane parallel to the major surface 10a. As in this example, in the case where the imaging element 10 surrounds the display unit 20, the real image 40 can be viewed from various viewing directions 86 around the display unit 20.

However, in the embodiment, as described later, the imaging element 10 only needs to be provided along at least one portion of the display unit 20. In the example shown in FIG. 2, one side of the display unit 20 is parallel to the X-axis. Another side of the display unit is parallel to the Y-axis.

Figure 3A:
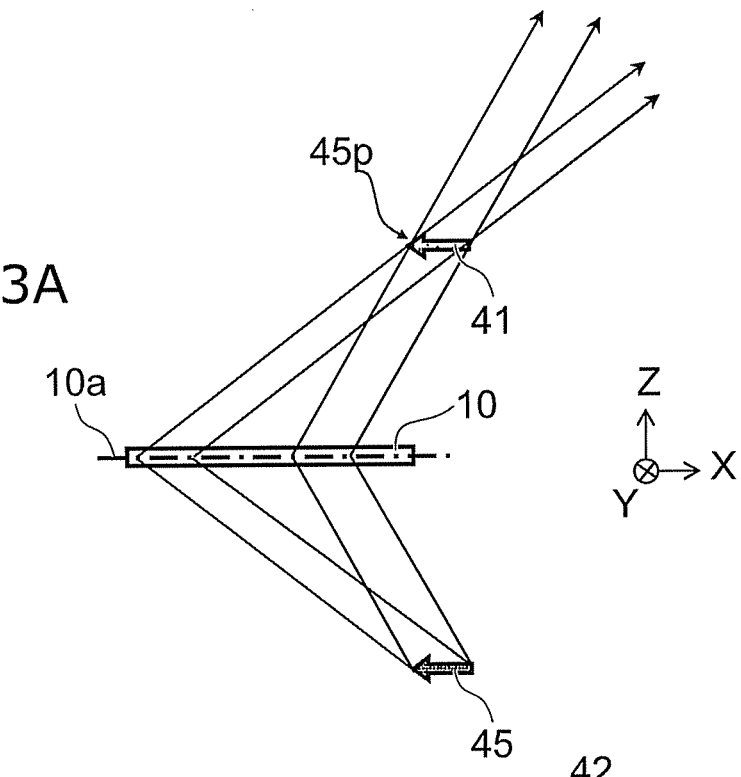
FIG. 3A and FIG. 3B are schematic views showing the characteristic of an optical element.
Figure 3B:
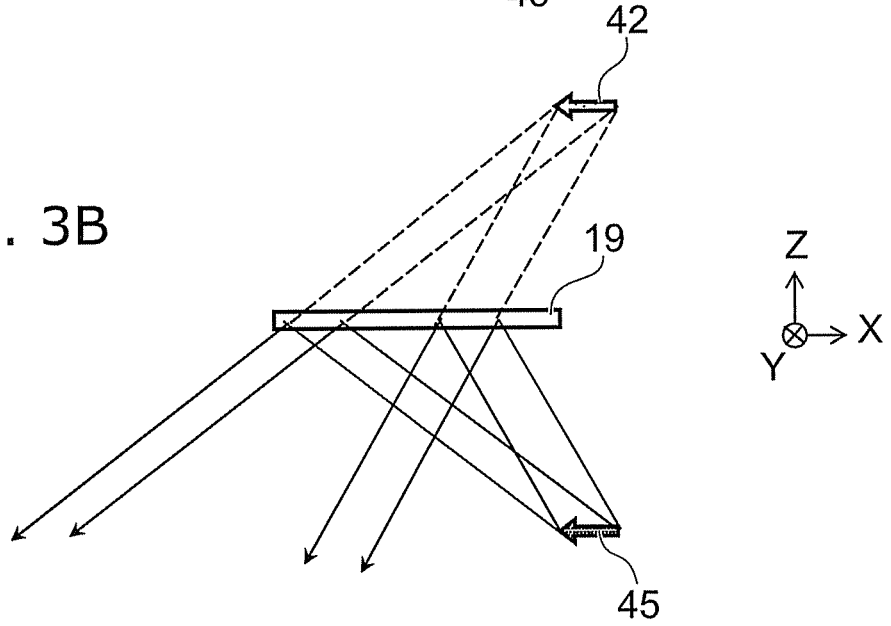

FIG. 3A and FIG. 3B are schematic views illustrating the characteristic of an optical element.

FIG. 3A illustrates the characteristic of the imaging element 10 according to the embodiment. FIG. 3B illustrates the characteristic of a mirror as one optical element.

As shown in FIG. 3B, an object 45 is positioned in front of the mirror 19. In this case, the mirror 19 reflects light from the object 45 at a surface of the mirror 19. Thus, the image formed by the mirror 19 is a virtual image 42.

On the other hand, as shown in FIG. 3A, in the case where the object 45 is positioned in front of the imaging element 10, the image formed by the imaging element 10 is a real image 41.

Both in the case of the mirror 19 and in the case of the imaging element 10, the formed image is plane-symmetric to the object 45 with respect to the device surface (the surface of the mirror 19, or the major surface 10a of the imaging element 10). While the mirror 19 forms a virtual image 42, the imaging element 10 forms a real image 41.

That is, as shown in FIG. 3A, the imaging element 10 includes a major surface 10a. The imaging element 10 forms a real image 41 of the object 45 at a symmetric position 45p of the object 45 with the major surface 10a serving as a plane of symmetry.

An example operation of this imaging element 10 is now described.

Figure 4:
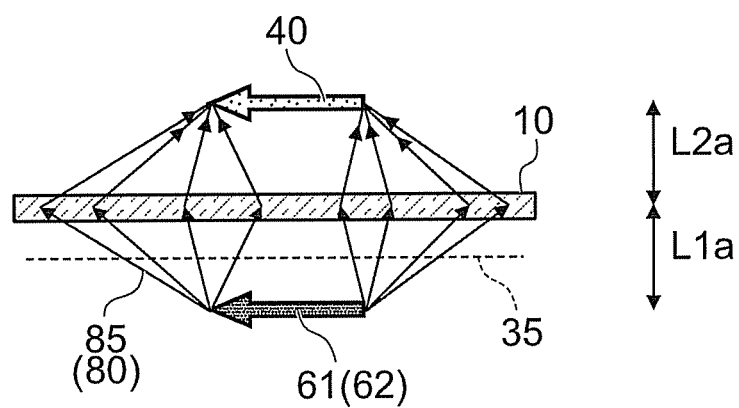
FIG. 4 is a schematic sectional view showing the operation of an element used in a display device.

FIG. 4 is a schematic sectional view illustrating the operation of an element used in a display device.

As shown in FIG. 4, a picture 61 (or object 62) is disposed to face the imaging element 10. That is, the state shown in FIG. 4 corresponds to the state in which the display unit 20 is disposed at the position of the picture 61. In this configuration, the light 80 emitted from the picture 61 changes its direction in the imaging element 10, and a real image 40 is formed. The position of the real image 40 is a position plane-symmetric to the picture 61 with respect to the major surface 10a of the imaging element 10.

In this case, the distance L1a between the imaging element 10 and the picture 61 is equal to the distance L2a between the imaging element 10 and the real image 40. Here, to form a real image 40 floating at a height of the distance L2a, the distance L1a between the imaging element 10 and the picture 61 is made equal to the distance L2a. In this configuration, the distance L1a between the imaging element 10 and the picture 61 (i.e., corresponding to the first distance L1 between the imaging element 10 and the display unit 20) is made longer.

Thus, in the configuration illustrated in FIG. 4, increasing the distance L2a between the real image 40 and the imaging element 10 (i.e., the floating amount of the real image) requires the distance L1a between the picture 61 and the imaging element 10 to be lengthened by the same amount. Hence, the display device is thicker.

Here, as illustrated in FIG. 4, a folding plane 35 for the optical path 85 is inserted between the imaging element 10 and the picture 61. Specifically, a first reflecting unit 31 is inserted.

Figure 5:
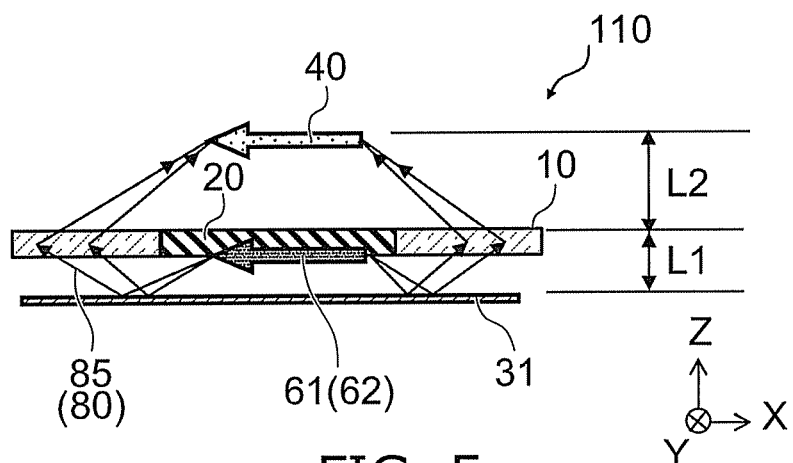
FIG. 5 is a schematic sectional view showing the operation of the display device according to the first embodiment.

FIG. 5 is a schematic sectional view illustrating the operation of the display device according to the first embodiment.

As shown in FIG. 5, in the display device 110 according to the embodiment, a first reflecting unit 31 is provided at the position of the aforementioned folding plane 35. Thus, the virtual image of the picture 61 is formed at the position symmetric with respect to the first reflecting unit 31 (folding plane 35). Furthermore, the virtual image of the picture 61 is imaged as a real image at the position symmetric to the imaging element 10.

Thus, the first distance L1 to the imaging element 10 is made shorter than the second distance L2 between the imaging element 10 and the real image 40. Specifically, the first distance L1 (corresponding to the thickness of the display device 110) is made half the second distance L2.

Thus, according to the embodiment, even if the floating amount of the real image 40 is increased to lengthen the second distance L2, the thickness of the display device 110 (first distance L1) can be maintained small. That is, a practical display device capable of increasing the floating amount of the real image can be provided.

Thus, in the embodiment, the optical path 85 is folded on the picture 61 side by the first reflecting unit 31. Thus, a thin display device can be realized.

Figure 6:
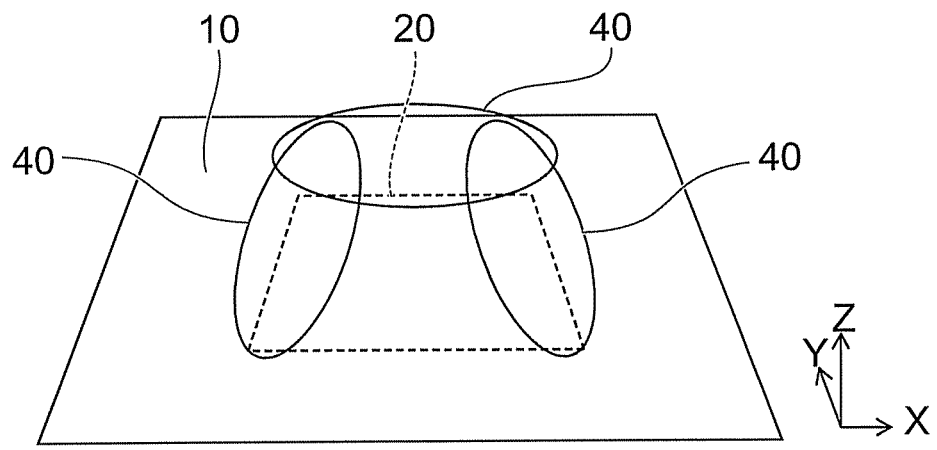
FIG. 6 is a schematic perspective view showing the operation of the display device according to the first embodiment.

FIG. 6 is a schematic perspective view illustrating the operation of the display device according to the first embodiment.

As shown in FIG. 6, the formed real image 40 is formed like floating above the plane including the imaging element 10. The display surface 20d of the display unit 20 is disposed on the opposite side from the side where the real image 40 is formed. Thus, the display surface 20d is not directly seen from the viewer.

In the embodiment, between the display unit 20 and the real image 40, at least one of e.g. another object, visual image, pattern, and letter may be displayed.

Figure 7:
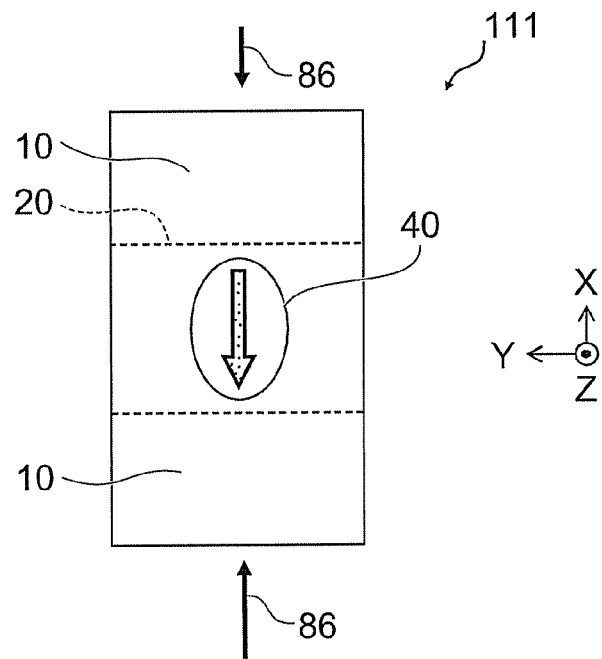
FIG. 7 is a schematic plan view showing another display device according to the first embodiment.

FIG. 7 is a schematic plan view illustrating the configuration of another display device according to the first embodiment.

As shown in FIG. 7, in the display device 111 according to the embodiment, the imaging element 10 is placed along part of the periphery of the display unit 20. In this example, for instance, the imaging element 10 sandwiches the display unit 20 along a direction parallel to the major surface 10a. The cross-sectional configuration of the display device 111 is similar to that of the display device 110, and hence the description thereof is omitted.

Thus, in the display device 111, the imaging element 10 is disposed along part of the periphery of the display unit 20. Accordingly, the planar size of the display device 111 can be reduced. In the case where the imaging element 10 is disposed on part of the periphery of the display unit 20, the viewing direction 86 of the real image 40 is limited.

In this embodiment, of the light 80 from the display unit 20 (the light of the picture 61), the light reaching the imaging element 10 without overlapping the display unit 20 (picture 61) contributes to forming the real image 40. Hence, by efficiently introducing the light 80 of the picture 61 into the imaging element 10, the decrease of light utilization efficiency can be suppressed. Here, of the light 80, the light reflected at the first reflecting unit 31 and then returned to the picture 61 does not contribute to forming the real image 40.

In the embodiment, the light 80 corresponding to the picture 61 is emitted from the display unit 20, reflected at the first reflecting unit 31, and then incident on the imaging element 10. As described later, directivity is preferably imparted to the emission light from the display unit 20 so that the light 80 emitted from the display unit 20 is efficiently incident on the imaging element 10.

Figure 8A:
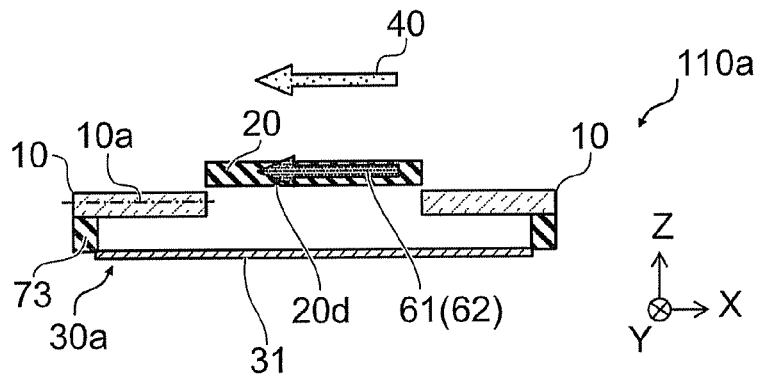
FIG. 8A and FIG. 8B are schematic sectional views showing display devices according to the first embodiment.
Figure 8B:
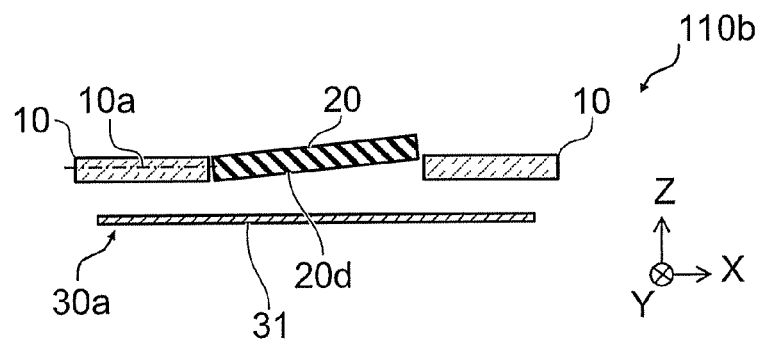

FIG. 8A and FIG. 8B are schematic sectional views illustrating the configuration of other display devices according to the first embodiment.

As shown in FIG. 8A, in another display device 110a according to the embodiment, the position along the Z-axis of the imaging element 10 is different from the position along the Z-axis of the display unit 20. For instance, the position along the Z-axis of the major surface 10a of the imaging element 10 is different from the position along the Z-axis of the display surface 20d of the display unit 20.

In the display devices 110 and 110a, the display surface 20d of the display unit 20 is parallel to the major surface 10a. However, it may not be parallel.

As shown in FIG. 8B, in another display device 110b according to the embodiment, the major surface 10a of the imaging element 10 is non-parallel to the display surface 20d of the display unit 20. However, in the display device 110b, the first reflecting unit 31 is parallel to the major surface 10a.

Also by the display devices 110a and 110b thus configured, a practical display device capable of increasing the floating amount of the real image can be provided.

Preferably, the display surface 20d of the display unit 20 is substantially parallel to the major surface 10a. Thus, the thickness of the display device can be thinned. For instance, the angle between the display surface 20d and the major surface 10a is ±30 degrees or less. More preferably, for a thinner device, the angle between the display surface 20d and the major surface 10a is e.g. ±20 degrees or less. However, for instance, in the case of forming the real image 41 of the object 45 at a desired position, this angle may be set arbitrarily.

The first reflecting unit 31 is substantially parallel to the major surface 10a. For instance, the angle between the reflecting surface of the first reflecting unit 31 and the major surface 10a is e.g. ±10 degrees or less. Thus, the image of the display unit 20 can be correctly formed. More preferably, this angle is e.g. ±5 degrees or less.

In the example described with reference to the display device 110, the real image 40 is formed by folding once. However, the number of times of folding may be two or more.

Figure 9:
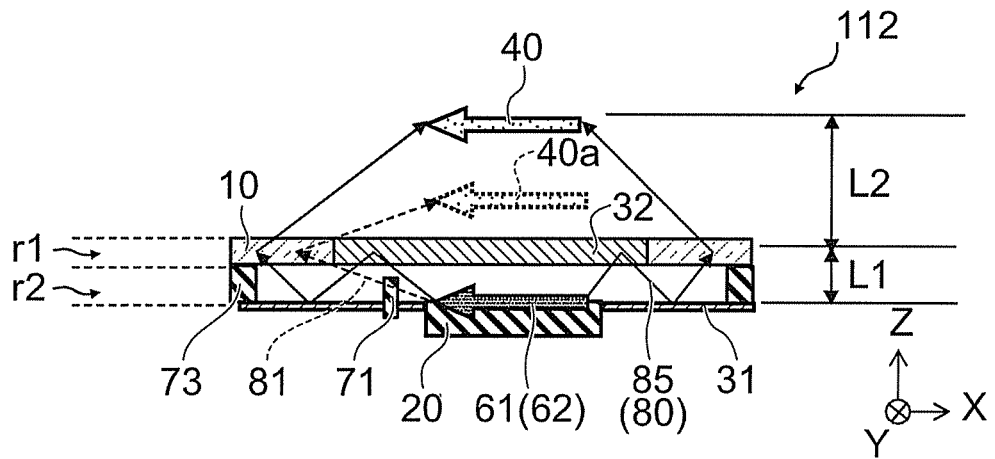
FIGS. 9 to 13 are schematic sectional views showing other display devices according to the first embodiment.

FIG. 9 is a schematic sectional view illustrating the configuration and operation of another display device according to the first embodiment.

As shown in FIG. 9, in the display device 112 according to the embodiment, the number of times of folding is two.

That is, the display device 112 further includes a second reflecting unit 32 in addition to the imaging element 10, the display unit 20, and the first reflecting unit 31.

The second reflecting unit 32 includes a portion not overlapping the imaging element 10 as viewed along the normal direction of the major surface 10a. For instance, the second reflecting unit 32 and the imaging element 10 are disposed in a direction non-parallel to the normal to the major surface 10a. In this example, the display unit 20 and the first reflecting unit 31 are disposed in a direction parallel to the major surface 10a. The second reflecting unit 32 and the imaging element 10 are disposed in a direction parallel to the major surface 10a.

The imaging element 10 is provided in a first region r1 shaped like a layer parallel to a plane in space. The second reflecting unit 32 and the imaging element 10 are disposed in the first region r1. The display unit 20 is provided in a second region r2 shaped like a layer provided parallel to the first region r1. The first reflecting unit 31 and the display unit 20 are disposed in the second region r2.

Here, the second reflecting unit 32 may be provided either in the plane in which the imaging element 10 is provided, or in a different plane. The first reflecting unit 31 may be provided either in the plane in which the display unit 20 is provided, or in a different plane.

The second reflecting unit 32 reflects the light 80 emitted from the display unit 20 and causes it to be incident on the first reflecting unit 31. The first reflecting unit 31 reflects the light reflected at the second reflecting unit 32 and causes it to be incident on the imaging element 10.

Thus, in this example, the second reflecting unit 32 is disposed in juxtaposition with the imaging element 10. The display unit 20 is disposed in juxtaposition with the first reflecting unit 31 facing the imaging element 10. Thus, the light 80 of the picture 61 travels along the optical path 85. The light 80 is reflected at the second reflecting unit 32 and the first reflecting unit 31. Then, the light 80 travels through the imaging element 10 and forms a real image 40.

In this case, the first distance L1 is made one third of the second distance L2. Thus, a thinner display device can be realized.

Here, the light 81 traveling from the picture 61, bypassing the first reflecting unit 31 and the second reflecting unit 32, and directly incident on the imaging element 10 results in forming a different real image 40a at a position different from the intended real image 40.

In this example, the display device 112 further includes a light control section 71. The light control section 71 attenuates the intensity of the light 80 emitted from the display unit 20 incident on the imaging element 10 without being incident on the first reflecting unit 31 (or at least one of the first reflecting unit 31 and the second reflecting unit 32). The light control section 71 e.g. blocks such light. Alternatively, the light control section 71 e.g. narrows the directivity of the light 80 emitted from the display unit 20 (the light 80 of the picture 61). This can suppress unwanted light being incident on the imaging element 10.

Also in this case, a distance control unit 73 can be provided. The distance control unit 73 can change the distance between the first reflecting unit 31 and the imaging element 10 (first distance L1).

Depending on the disposal of the imaging element 10, the display unit 20, and the first reflecting unit 31, the distance control unit 73 may change the distance between the first reflecting unit 31 and the display unit 20. That is, the distance control unit 73 can change at least one of the distance between the first reflecting unit 31 and the display unit 20, and the distance between the first reflecting unit 31 and the imaging element 10.

Figure 10:
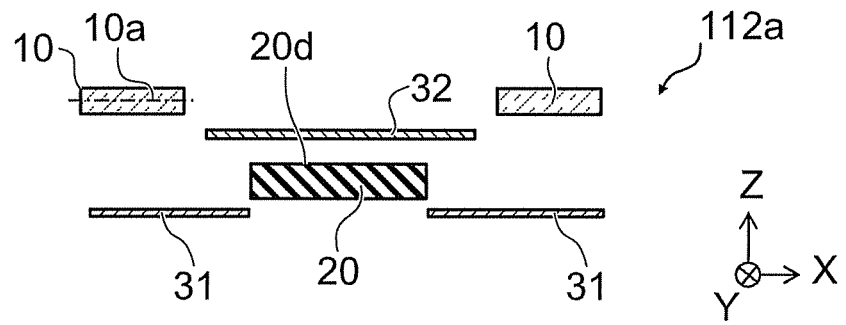

FIG. 10 is a schematic sectional view illustrating the configuration of another display device according to the first embodiment. As shown in FIG. 10, in the display device 112a, the position along the Z-axis of the display unit 20 is different from the position along the Z-axis of the first reflecting unit 31. The position along the Z-axis of the second reflecting unit 32 is different from the position along the Z-axis of the imaging element 10. Also by the display device 112a, a practical display device capable of increasing the floating amount of the real image can be provided. In the display devices 112 and 112a, they may be non-parallel to the major surface 10a of the imaging element 10.

Figure 11:
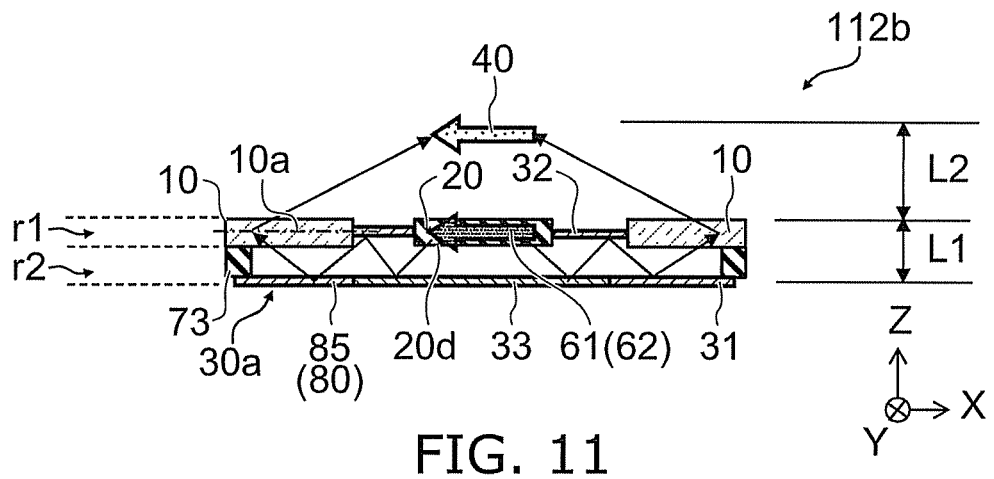

FIG. 11 is a schematic sectional view illustrating the configuration of another display device according to the first embodiment. As shown in FIG. 11, the display device 112b further includes a third reflecting unit 33 in addition to the imaging element 10, the display unit 20, the first reflecting unit 31, and the second reflecting unit 32.

The third reflecting unit 33 includes a portion not overlapping the first reflecting unit 31 as viewed along the normal to the major surface 10a. For instance, the third reflecting unit 33 and the first reflecting unit 31 are disposed in a direction non-parallel to the normal to the major surface 10a. In this example, the display unit 20 and the imaging element 10 are disposed in a direction parallel to the major surface 10a. The second reflecting unit 32 and the display unit 20 are disposed in a direction parallel to the major surface 10a. The third reflecting unit 33 and the first reflecting unit 31 are disposed in a direction parallel to the major surface 10a.

In the display device 112b thus configured, the number of times of folding is three. Thus, the number of times of folding is arbitrary. Also by the display device 112b, a practical display device capable of increasing the floating amount of the real image can be provided.

Figure 12:
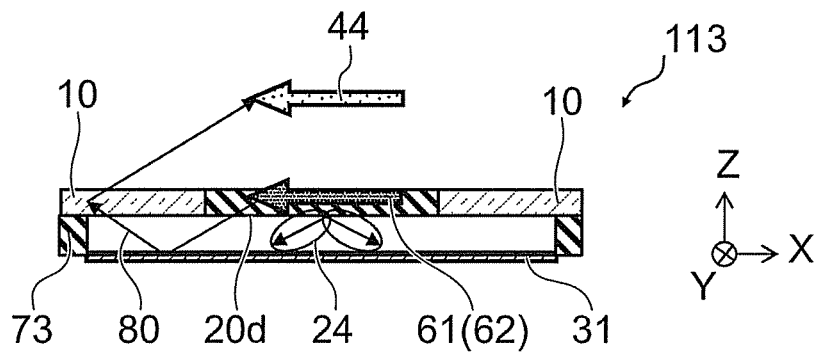

FIG. 12 is a schematic sectional view illustrating the configuration of another display device according to the first embodiment. As shown in FIG. 12, in the display device 113 according to the embodiment, the intensity of the light 80 emitted from the display unit 20 in the direction (Z-axis direction) perpendicular to the display surface 20d of the display unit 20 is lower than the intensity of the light 80 emitted from the display unit 20 in a direction inclined from the Z-axis direction.

For instance, such light distribution 24 is obtained by using a light emitting diode of the side emitter type as a light source of the display device used for the display unit 20. The light is incident more easily on the imaging element 10 after being reflected at the first reflecting unit 31. This improves the display efficiency.

Of the light 80 emitted from the display unit 20, the light reflected at the first reflecting unit 31 and then returned to the display unit 20 does not contribute to forming the real image 40. Hence, it is preferable to increase the ratio of the light component reflected once at the first reflecting unit 31 and then reaching the imaging element 10.

As the display unit 20, a liquid crystal display device using a direct type backlight based on a light emitting diode of the side emitter type is used. Thus, the light 80 emitted from the display unit 20 can be efficiently brought to the imaging element 10. Hence, the light utilization efficiency can be significantly increased.

Figure 13:
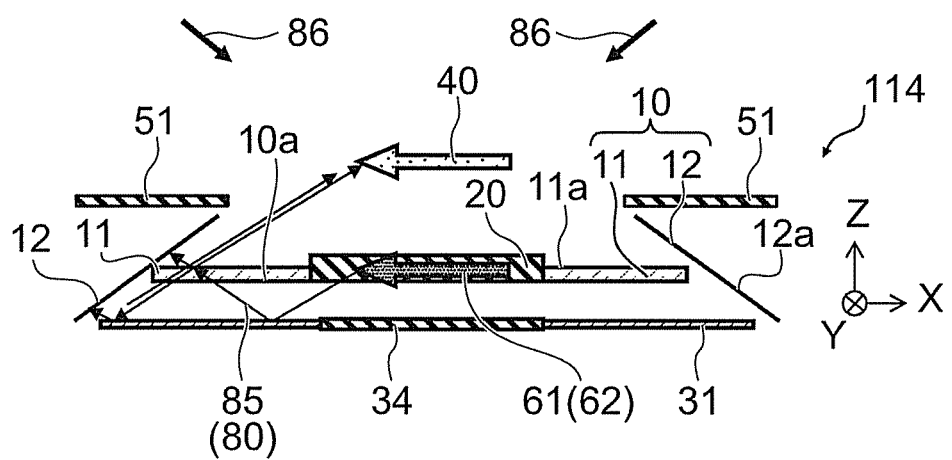

FIG. 13 is a schematic sectional view illustrating the configuration of another display device according to the first embodiment. As shown in FIG. 13, in another display device 114 according to the embodiment, the imaging element 10 includes a half mirror 11 and a retroreflective plate 12. For instance, the half mirror 11 is provided together with the display unit 20. The major surface 11a of the half mirror 11 is e.g. substantially parallel to the X-Y plane. The major surface 12a of the retroreflective plate 12 is e.g. inclined with respect to the X-Y plane. The retroreflective plate 12 faces the half mirror 11 and further faces the first reflecting unit 31. In this example, the major surface 11a of the half mirror 11 corresponds to the major surface 10a of the imaging element 10.

The light 80 emitted from the display unit 20 is reflected at the first reflecting unit 31 and then incident on the half mirror 11. Of the light 80, the component transmitted through the half mirror 11 is retroreflected at the retroreflective plate 12 and then reaches again the half mirror 11. The component specularly reflected here forms a real image 40. The component transmitted through the half mirror 11 returns to the display unit 20 and results in a loss.

On the other hand, the light 80 reflected at the first reflecting unit 31 and then reflected at the half mirror 11 is reflected again at the first reflecting unit 31. Then, the light 80 is retroreflected at the retroreflective plate 12 and reflected at the first reflecting unit 31. Then, part of this light 80 is transmitted through the half mirror 11 and contributes to forming the real image 40.

In this configuration, the retroreflective plate 12 is preferably placed so as not to be seen from the viewing direction 86. For instance, the retroreflective plate 12 is shielded with e.g. a shield 51. For a practical retroreflective plate 12, it is difficult to retroreflect all the light, but at least one of specular reflection and scattering occurs to some extent. Thus, this characteristic hinders observation of the real image 40 from the viewing direction 86. Here, if the retroreflective plate 12 is placed at a position not seen from the viewing direction 86, the reflecting unit of the retroreflective plate 12 is not observed. Thus, such hindrance can be suppressed.

As the display unit 20, a transmissive liquid crystal display device including a backlight is used. The display unit 20 can display an arbitrary picture 61. Around the display unit 20, the imaging element 10 is provided. The first reflecting unit 31 is provided to face the display unit 20 and the imaging element 10. The display surface 20d of the display unit 20 is directed to the side facing the first reflecting unit 31.

In the display device 114 configured as described above, a floating real image 40 can be observed. The distance between the real image 40 and the display device 114 (second distance L2) is twice the distance between the first reflecting unit 31 and the display unit 20 (first distance L1). Thus, a thin display device can be realized.

By a distance control unit 73 (such as a spacer) based on e.g. mechanical or electrical means, the gap between the first reflecting unit 31 and the display unit 20 can be changed. Thus, the distance between the imaging element 10 and the real image 40 (second distance L2) can be changed. If the height of the spacer constituting the distance control unit 73 is doubled, the floating amount of the real image 40 is doubled.

In this example, the first reflecting unit 31 is provided with a light absorption layer 34 provided in a portion facing the display unit 20. The light absorption layer 34 is described below with reference to a second embodiment.

Second Embodiment

Figure 14:
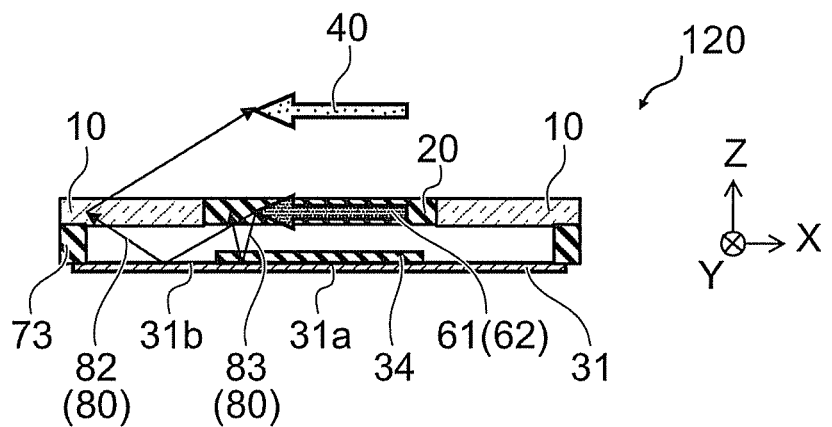
FIG. 14 is a schematic sectional view showing a display device according to a second embodiment.

FIG. 14 is a schematic sectional view illustrating the configuration of a display device according to the second embodiment.

As shown in FIG. 14, in the display device 120 according to the embodiment, the first reflecting unit 31 includes a light absorption layer 34 provided in a portion facing the display unit 20. The rest of the configuration can be made similar to that of the display device 110, and hence the description thereof is omitted.

In FIG. 14, of the light 80 emitted from the display unit 20, the light 82 reflected once at the first reflecting unit 31 and then reaching the imaging element 10 contributes to forming a desired real image 40. However, the light 83 undergoing a plurality of multiple reflections between the first reflecting unit 31 and the display unit 20 forms a real image different from the desired real image 40 after reaching the imaging element 10.

In the display device 120, a light absorption layer 34 is provided in the portion of the first reflecting unit 31 facing the display unit 20. Thus, the light 82 is absorbed in the light absorption layer 34. This can suppress formation of the real image different from the desired real image 40.

Here, instead of providing a light absorption layer 34, the portion of the first reflecting unit 31 facing the display unit 20 may be removed. In this case, the light 82 is emitted outside the display device.

Thus, the first reflecting unit 31 includes a facing region 31a facing to the display unit 20, and a non-facing region 31b not facing the display unit 20. The reflectance of at least part of the facing region 31a (e.g., the portion provided with the light absorption layer 34) is lower than the reflectance of the non-facing region 31b. This can suppress formation of the aforementioned real image different from the desired real image 40.

Third Embodiment

Figure 15:
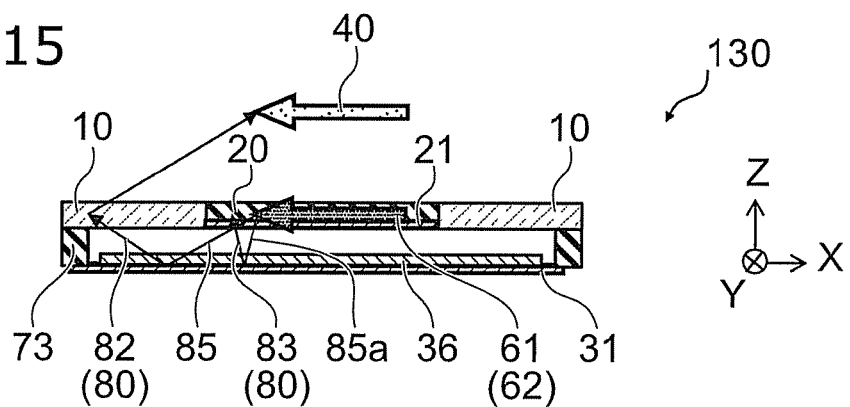
FIG. 15 is a schematic sectional view showing the configuration of a display device according to a third embodiment.

FIG. 15 is a schematic sectional view illustrating the configuration of a display device according to a third embodiment.

As shown in FIG. 15, the display device 130 according to this embodiment further includes a retardation element 36 provided on the first reflecting unit 31. The rest of the configuration can be made similar to that of the display device 110, and hence the description thereof is omitted.

In the display device 130, formation of a real image different from the desired real image 40 is suppressed by using polarization of light. The real image different from the desired real image 40 is formed by multiple reflection between the first reflecting unit 31 and the display unit 20. For instance, as the display unit 20, a liquid crystal display device is used. This liquid crystal display device is provided with a polarizing plate 21. Thus, the liquid crystal display device substantially emits linearly polarized light.

The linearly polarized light emitted from the display unit 20 is reflected at the first reflecting unit 31. Then, part of the linearly polarized light is returned to the display unit 20 and absorbed. The other part reaches the imaging element 10 and is directly used to form a real image 40. This suppresses formation of a real image different from the desired real image 40.

Thus, the display unit 20 includes a polarizing plate 21 provided on the display surface 20d for emitting light. The display device 130 further includes a retardation element 36.

The retardation element 36 is provided between the polarizing plate 21 and the first reflecting unit 31 on the optical path 85a between the display unit 20 and the first reflecting unit 31. The retardation element 36 rotates the polarization direction of the polarized light emitted from the polarizing plate 21.

Specifically, the retardation element 36 is provided in the optical path 85a between the display unit 20 with a polarizing plate 21 affixed to the uppermost surface thereof, and the first reflecting unit 31. The retardation element 36 rotates the polarization direction of the linearly polarized light emitted from the display unit 20 by 90 degrees in the optical path 85a of being reflected at the first reflecting unit 31 and then incident on the display unit 20.

In the display device 130, as the retardation element 36, for instance, a quarter wavelength plate is used. The ordinary axis direction of the retardation element 36 is set to the direction in which the linearly polarized light outgoing from the display unit 20 is reflected with rotation closest to 90 degrees.

Of the linearly polarized light emitted from the display unit 20, the light 82 reaching the first reflecting unit 31 and then reaching the imaging element 10 contributes to forming a real image 40. Here, the polarization plane of the light 82 is rotated, but it does not substantially affect the formation of the real image 40. On the other hand, of the linearly polarized light emitted from the display unit 20, the polarization plane of the light 83 reaching the first reflecting unit 31 and then returned to the display unit 20 is rotated 90 degrees by the retardation element 36. Thus, the light 83 is absorbed in the polarizing plate of the display unit 20. As a result, formation of the real image different from the desired real image 40 is suppressed.

Figure 16:
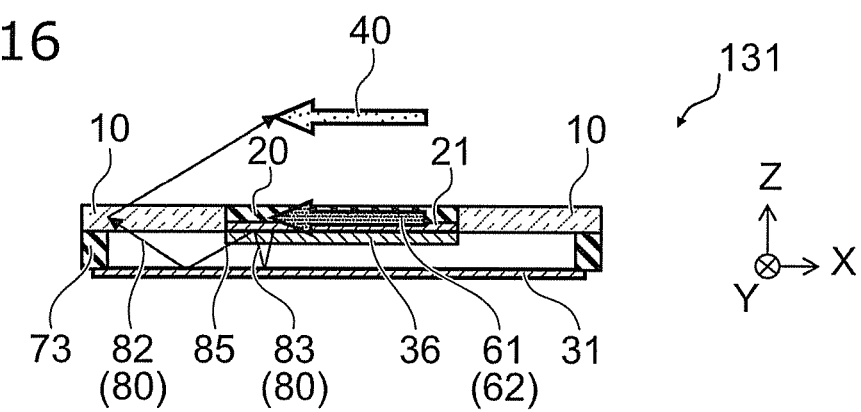
FIG. 16 is a schematic sectional view showing another display device according to the third embodiment.

FIG. 16 is a schematic sectional view illustrating the configuration of another display device according to the third embodiment. As shown in FIG. 16, another display device 131 according to the embodiment also includes a retardation element 36. The rest of the configuration can be made similar to that of the display device 110, and hence the description thereof is omitted.

Also in this case, as the display unit 20, a liquid crystal display device provided with a polarizing plate is used. In the display device 131, the retardation element 36 is provided on the surface of the display unit 20 facing the first reflecting unit 31.

Thus, of the elliptically polarized emission light, the light 83 reflected at the first reflecting unit 31 and returned to the display unit 20 undergoes phase inversion in its elliptical polarization. Hence, the light 83 is absorbed in the polarizing plate. Also in this case, as the retardation element 36, for instance, a quarter wavelength plate is used. The ordinary axis direction of the retardation element 36 is determined so as to maximize optical absorption in the polarizing plate. The light 82 reaching the imaging element 10 without returning to the display unit 20 contributes to forming a real image 40. Also in the display device 131, formation of a real image different from the desired real image 40 is suppressed.

The retardation element 36 only needs to be located between the display unit 20 and the first reflecting unit 31. That is, the retardation element 36 is provided at at least one of a first position between the polarizing plate 21 and the first reflecting unit 31, a second position on the polarizing plate 21, and a third position on the first reflecting unit 31. The retardation element 36 rotates the polarization direction of the polarized light (e.g., linearly polarized light) emitted from the display unit 20 by substantially 90 degrees in the optical path 85a of being reflected at the first reflecting unit 31 and then incident on the display unit 20.

Fourth Embodiment

Figure 17:
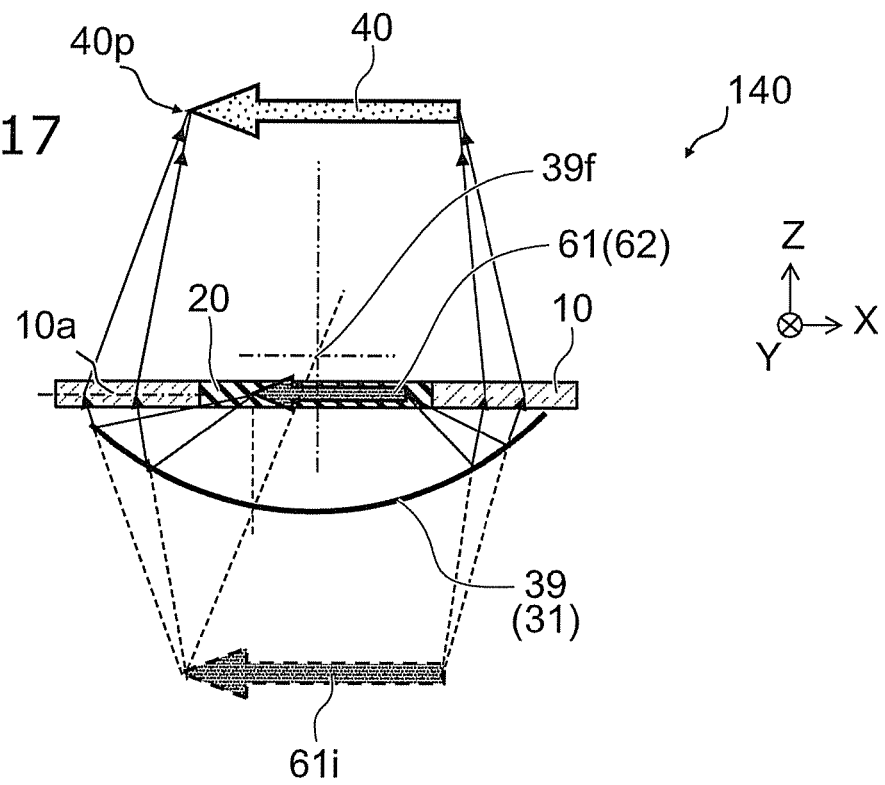
FIG. 17 is a schematic sectional view showing a display device according to a fourth embodiment.

FIG. 17 is a schematic sectional view illustrating the configuration of a display device according to a fourth embodiment.

As shown in FIG. 17, in the display device 140 according to the embodiment, the first reflecting unit 31 includes a concave mirror 39. That is, as the first reflecting unit 31, a concave mirror 39 is used. The rest of the configuration can be made similar to that of the display device 110, and hence the description thereof is omitted.

The first reflecting unit 31 faces the imaging element 10, and further faces the display unit 20. In the display device 140, the display unit 20 is disposed between the concave mirror 39 and the focus 39f of the concave mirror 39. By the action of the concave mirror 39, a virtual image 61i of the picture 61 of the display unit 20 is formed. The virtual image 61i is formed as a magnified image below the concave mirror 39 (on the opposite side from the focus 39f). The imaging element 10 forms a real image 40 of this virtual image 61i at a symmetric position 40p with the major surface 10a of the imaging element 10 serving as a plane of symmetry.

In the display device 140, by the action of the concave mirror 39, the real image 40 is magnified. Thus, a small picture 61 can be magnified to form a real image 40. Hence, a more effective picture can be formed. In other words, the display unit 20 can be downsized.

Like the first embodiment, by adjusting the gap between the display unit 20 and the concave mirror 39, the magnification scale of the real image 40 can be changed. Thus, the distance between the imaging element 10 and the real image 40 can be changed. If the picture 61 of the display unit 20 is made close to the focus 39f of the concave mirror 39, the magnification scale is increased, and the distance between the display unit 20 and the real image 40 is lengthened.

Also in this case, the first reflecting unit 31 may include a light absorption layer 34 facing the display unit 20.

Fifth Embodiment

Figure 18:
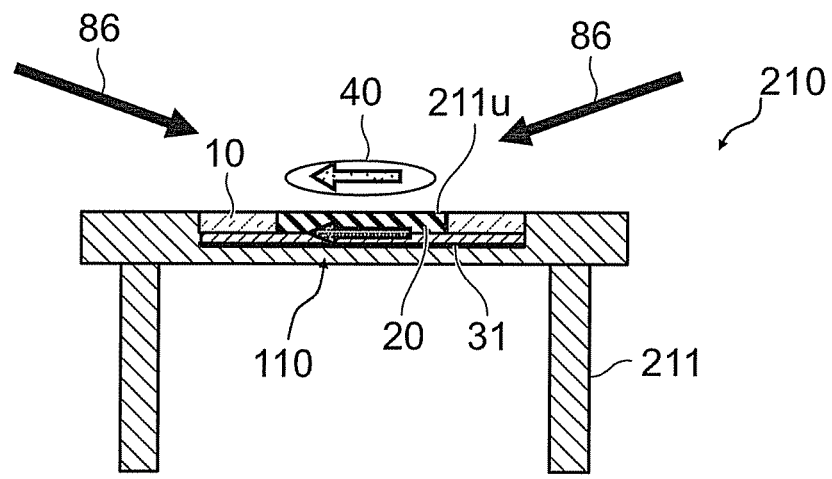
FIG. 18 is a schematic sectional view showing a display device according to a fifth embodiment.

FIG. 18 is a schematic sectional view illustrating the configuration of a display device according to a fifth embodiment.

As shown in FIG. 18, the display device 210 according to the embodiment further includes a support body 211 for supporting the imaging element 10, the display unit 20, and the first reflecting unit 31. For the imaging element 10, the display unit 20, and the first reflecting unit 31, for instance, the configuration described with reference to the display device 110 is adopted. However, the embodiment is not limited thereto. The configuration of any of the display devices described with reference to the first to fourth embodiments and the variations thereof is applicable.

In the display device 210, as the support body 211, for instance, a desk is used. The imaging element 10, the display unit 20, and the first reflecting unit 31 are embedded in the upper surface 211u of the support body 211 (the upper surface of the desk). The viewer around the support body 211 views a real image 40 displayed by the display device 210 in the viewing direction 86. The real image 40 is perceived above the imaging element 10, the display unit 20, and the first reflecting unit 31. In the display device 210, the real image 40 can be observed from a plurality of viewing directions 86.

Furthermore, for instance, an arbitrary object can be placed between the display unit 20 and the real image 40. Thus, a user interface capable of superimposing the object on the real image 40 can be realized.

Sixth Embodiment

Figure 19:
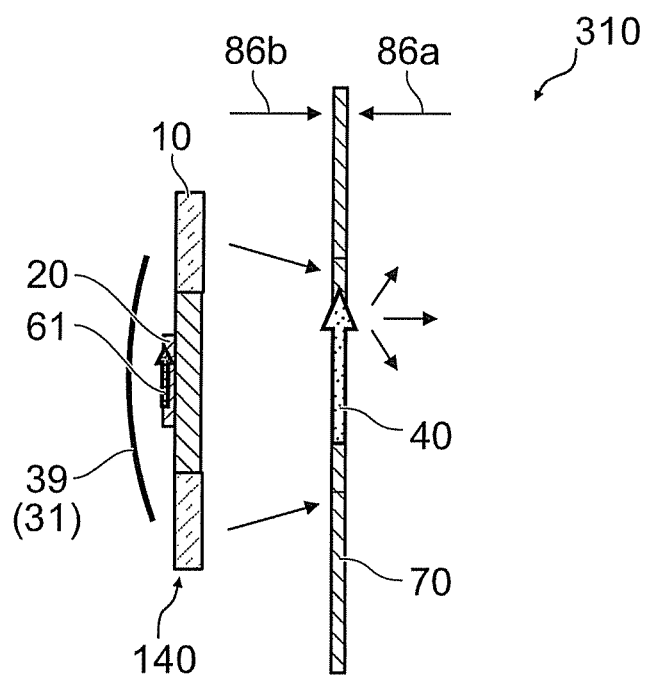
FIG. 19 is a schematic sectional view showing a display device according to a sixth embodiment.

FIG. 19 is a schematic sectional view illustrating the configuration of a display device according to a sixth embodiment.

As shown in FIG. 19, the display device 310 according to the embodiment further includes a screen 70 in addition to the imaging element 10, the display unit 20, and the first reflecting unit 31. For the imaging element 10, the display unit 20, and the first reflecting unit 31, for instance, the configuration described with reference to the display device 140 is adopted.

The screen 70 is disposed at the position where the real image 40 is to be formed. The screen 70 has e.g. a light scattering property. The screen 70 may have a light transmissive property. Furthermore, the screen 70 may have a light reflective property.

The picture 61 formed in the display unit 20 is magnified by the first reflecting unit 31 (concave mirror 39), and then imaged as a real image 40 at the position of the screen 70.

In the case where a light transmissive screen 70 is disposed, the light of the real image 40 is scattered at wide angles. Thus, the display device 310 functions as a rear projector with a wide viewing angle. This rear projector is used in the first viewing direction 86a (the direction from the screen 70 toward the imaging element 10). A low-profile rear projector with a short distance from the optical element to the screen 70 can be provided.

On the other hand, in the case of using a light reflective screen 70, the display device 310 serves as a front projector with a wide viewing angle. This front projector is used in the second viewing direction 86b (the direction from the imaging element 10 toward the screen 70). The thickness of the display device 310 can be thinned. Thus, a low-profile and compact front projector can be provided.

According to the embodiments, a practical display device capable of increasing the floating amount of the real image is provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

The embodiments of the invention have been described above with reference to examples. However, the embodiments of the invention are not limited to these examples. For instance, any specific configurations of various components such as the display unit, imaging element, reflecting unit, concave mirror, light control section, distance control unit, light absorption layer, and retardation element included in the display device are encompassed within the scope of the invention as long as those skilled in the art can similarly practice the invention and achieve similar effects by suitably selecting such configurations from conventionally known ones.

Further, any two or more components of the specific examples may be combined within the extent of technical feasibility and are included in the scope of the invention to the extent that the purport of the invention is included.

In addition, those skilled in the art can suitably modify and implement the display device described above in the embodiments of the invention. All the display devices thus modified are also encompassed within the scope of the invention as long as they fall within the spirit of the invention.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device comprising:
a display unit to emit a light;
an imaging element having a major surface and configured to form a real image of an object at a symmetric position of the object with the major surface serving as a plane of symmetry, the imaging element including a portion not overlapping the display unit as viewed along a normal direction of the major surface; and
a first reflecting unit including a portion facing the major surface, and configured to reflect the light emitted from the display unit and to cause the light to be incident on the portion of the imaging element not overlapping the display unit,
wherein the light emitted from the display unit is incident on the first reflecting unit,
the incident light on the first reflecting unit is reflected at the first reflecting unit, and
the reflected light at the first reflecting unit is incident on the imaging unit.

2. The device according to claim 1, wherein the display unit and the imaging element are disposed in a direction parallel to the major surface.

3. The device according to claim 1, further comprising:
a second reflecting unit including a portion not overlapping the imaging element as viewed along a normal direction of the major surface,
the second reflecting unit is configured to reflect the light emitted from the display unit and cause the light to be incident on the first reflecting unit, and
the first reflecting unit is configured to reflect the light emitted from the second reflecting unit and cause the light to be incident on the imaging element.

4. The device according to claim 3, wherein the second reflecting unit and the imaging element are disposed in a direction non-parallel to a normal to the major surface.

5. The device according to claim 3, wherein
the display unit and the first reflecting unit are disposed in a direction parallel to the major surface, and
the second reflecting unit and the imaging element are disposed in a direction parallel to the major surface.

6. The device according to claim 1, wherein a reflecting surface of the first reflection section which reflects the light emitted from the display unit is parallel to the major surface.

7. The device according to claim 1, wherein an absolute value of an angle between a reflecting surface of the first reflection section reflecting the light emitted from the display unit and the major surface is not more than 10 degrees.

8. The device according to claim 1, wherein the imaging element sandwiches the display unit along a direction parallel to the major surface.

9. The device according to claim 1, wherein the imaging element surrounds the display unit in a plane parallel to the major surface.

10. The device according to claim 1, wherein the display unit includes a display surface configured to emit the light, and the display surface is parallel to the major surface.

11. The device according to claim 1, wherein the display unit includes a display surface configured to emit the light, and an absolute value of an angle between the display surface and the major surface is not more than 30 degrees.

12. The device according to claim 1, wherein
the first reflecting unit includes a concave mirror and further faces the display unit, and
the display unit is disposed between a focus of the concave mirror and a mirror surface of the concave mirror.

13. The device according to claim 12, further comprising a screen disposed at a position of the real image.

14. The device according to claim 1, wherein the first reflecting unit includes a facing region to face the display unit, and a non-facing region not to face the display unit, and a reflectance of at least a part of the facing region is lower than a reflectance of the non-facing region.

15. The device according to claim 1, wherein the first reflecting unit includes a light absorption layer facing the display unit.

16. The device according to claim 1, further comprising:
a distance control unit to change a distance between the first reflecting unit and the imaging element.

17. The device according to claim 1, wherein
the display unit includes a polarizing plate provided on a display surface to emit the light, and
the device further includes a retardation element provided between the polarizing plate and the first reflecting unit on an optical path between the display unit and the first reflecting unit, and configured to rotate a polarization direction of a polarized light emitted from the polarizing plate.

18. The device according to claim 17, wherein the retardation element is configured to rotate the polarization direction of the light which returns to the polarizing plate by 90 degrees.

19. The device according to claim 1, wherein an intensity of the light emitted from the display unit in a direction perpendicular to a display surface of the display unit is lower than an intensity of the light emitted from the display unit in a direction inclined from the perpendicular direction.

20. The device according to claim 19, wherein the display unit includes a liquid crystal display device using a direct type backlight with a light emitting diode of a side emitter type.

* * * * *